United States Patent [19]
Bazell et al.

[11] Patent Number: 5,639,366
[45] Date of Patent: Jun. 17, 1997

[54] CONCENTRATOR FOR SOLIDS IN A LIQUID MEDIUM

[75] Inventors: Graydon C. Bazell; Michael P. Engel, both of Concord, Calif.

[73] Assignee: Bazell Technologies Corporation, Concord, Calif.

[21] Appl. No.: 523,106

[22] Filed: Sep. 1, 1995

[51] Int. Cl.$^6$ .......................... B01D 21/02; B01D 21/26
[52] U.S. Cl. .................. 210/304; 210/416.1; 210/512.1; 210/521
[58] Field of Search ...................... 210/512.1, 466.1, 210/295, 304, 513, 521, 532.1

[56] References Cited

U.S. PATENT DOCUMENTS

| | | |
|---|---|---|
| 2,565,343 | 8/1951 | Benham . |
| 3,865,725 | 2/1975 | Condolios et al. . |
| 3,879,296 | 4/1975 | Schneider ................ 210/512.1 |
| 4,265,740 | 5/1981 | Luthi . |
| 4,492,635 | 1/1985 | Stigebrandt ................ 210/519 |
| 4,747,962 | 5/1988 | Smisson ................ 210/788 |
| 5,114,568 | 5/1992 | Brinsmead et al. ................ 209/170 |
| 5,116,516 | 5/1992 | Smisson ................ 210/747 |
| 5,227,061 | 7/1993 | Bedsole ................ 210/304 |
| 5,300,222 | 4/1994 | Broussard, Sr. ................ 210/202 |
| 5,368,735 | 11/1994 | Ford ................ 210/512.1 |
| 5,409,618 | 4/1995 | Price ................ 210/416.1 |

*Primary Examiner*—David A. Reifsnyder
*Attorney, Agent, or Firm*—Bielen, Peterson & Lampe

[57] ABSTRACT

A solids concentrator for a liquid and solid mixture utilizing a first container including an upper portion and a lower portion. The upper portion has a transverse dimension that is larger than the transverse dimension of the lower portion. A second container fits within the first container and includes upper and lower portions that are configured to fit within the first container. The upper portion of the first and second containers forms a channel or chamber therebetween. Another chamber is formed between the lower portions of the first and second container, but is narrower across than the first chamber. The flowable liquid and solid mixture is introduced into the first chamber to induce a swirling flow to the second chamber and the inner space of the second container at the bottom of the concentrator. A solid-rich portion of the liquid solid mixture is removed from the lower portion of the inner space of the second chamber or the second chamber itself. The solids-lean portion of the mixture is removed from the upper portion of the inner space of the second chamber.

11 Claims, 2 Drawing Sheets

CONCENTRATOR FOR SOLIDS IN A LIQUID MEDIUM

BACKGROUND OF THE INVENTION

The present invention relates to a novel and useful concentrator for a liquid-solid mixture.

A number of methods have been proposed for separating components of a mixture into individual fractions. The most common technique is called mechanical separation, which must be distinguished from separations that depend on phase changes such as vaporization, solution, precipitation, condensation, and the like. Mechanical separations apply to heterogenous mixtures rather than homogenous solutions or colloidal type suspensions.

To separate solids from liquids, various methods may be employed such as a screen or filter, which retains one component and allows the other to pass. Other methods of separation utilize the disparity of velocity of particles due to size or density differences. Still, other devices employ centrifugal force to replace the force of gravity to separate solids from liquids.

In this regard, U.S. Pat. No. 5,114,568 separates contaminants in solid employing a gas-sparged centrifugal separation. The apparatus may be mounted on a front end loader for mobility.

U.S. Pat. Nos. 3,865,725 and 4,492,635 employ a central feed to a tank and employ partitions and centrifugal force to separate solids from liquids. In each case, a bottom discharge is employed for either the separated solids or the remaining liquid.

U.S. Pat. No. 5,368,735 describes a liquid/solid separator which employs a spin plate to reverse the axial direction of flow of the liquid/solid mixture. The chamber is separated vertically by a vortex section and a quiescent section above the same to effect separation. A drain is employed at the bottom to remove settled solids.

U.S. Pat. No. 4,265,740 shows a separator which utilizes an outer vessel and conical body having a central flow region. Strong rotational movement of a pulp water mixture is changed in movement to a translational movement to encourage downward movement and removal of the heavy impurities. Liquid and pulp moving upwardly spiral to an upper outlet where the pulp slurry is removed from the vessel.

U.S. Pat. No. 5,227,061 shows a fuel/contaminant separator which utilizes a conical shaped outer vessel and a collection section in the form of perforated cone filter. The heavier particles are trapped therein permitting lighter fuel particles to spiral upwardly for removal from the upper section of the vessel.

U.S. Pat. No. 5,300,222 shows an apparatus for clarifying water in which an oil water mixture is introduced to produce a cyclonic flow. The water and oil are separated by aeration provided by eductors and oil and gas are removed from the upper portion of the cyclonic flow chamber for further separation. Solids are removed from a trap at the nadir of the vessel.

U.S. Pat. Nos. 4,747,962 and 5,116,516 show fluid separators that separate sinkable and floating solids from water. Dip plates are employed in a conical vessel to promote rotational movement of the liquid such that the heavy solids are removed from the bottom portion of the vessel. Light solids are removed from the top.

U.S. Pat. No. 2,565,343 shows a liquid separator which may be employed to separate liquids immiscible with water, solids, and gases from effluent from a manufacturing process. The separator employs a conical vessel and an inner plate which is in the form of an inverted cone. Liquid passes through the annular space between the vessels and moves up into a funnel lying inside the inverted cone which draws off the water based liquids. Oils float to the top of the inverted cone chamber and are removed from the vessel at that point, while solids are drained from the bottom of the vessel.

All of the prior art references suffer from the use of complex moving parts and sump discharge ports which are difficult to use and operate, especially in a continuous operation. The latter disadvantage is especially pertinent in a field where machine oils are employed to carry abraded products from forming and milling operations.

A solid concentrator for a liquid and solid mixture which overcomes the problems found in the prior art would be a notable advance in the manufacturing field.

SUMMARY OF THE INVENTION

In accordance with the present invention a novel and useful solid concentrator for liquid solid mixture is herein provided.

The concentrator of the present invention utilizes a first container having an upper portion with a particular transverse dimension and a lower portion with a transverse dimension which is smaller than the upper portion. The lower portion of the first container may include mitred walls such as those formed by a cone. First container also includes a bottom for holding the liquid solid mixture. In certain embodiments, the first container upper portion may be cylindrical in shape while the lower portion may be frusto-conical in shape.

A smaller second container is sized to fit within the first container. The second container includes an upper portion having a transverse dimension and a lower portion having a smaller transverse dimension. The second container also includes an inner space. The first and second container upper portions are thus spaced from one another to form a first, generally annular, chamber therebetween. Likewise, the first and second container lower portions are separated from one another to form a second, generally annular, chamber which is smaller across than the first chamber. The second chamber communicates with the first chamber and the inner space lower portion formed by the second chamber. The second chamber may also include a cylindrical upper portion and a frusto conical lower portion.

Transporting means is also found in the present invention for introducing a flowable liquid and solids mixture into the first chamber. Such transporting means may include a conduit for directing liquid and solids mixture along and around the first container upper portion such that liquids and solids in the first and second chambers spiral downwardly toward the bottom of the first container.

First removal means is also found in the present invention for transferring a pre-determined solids-rich portion of the liquid and solids mixture from either the second chamber, between the first and second vessels, or the inner space lower portion, adjacent the exit from the second chamber.

In addition, second removal means is also employed for transferring a pre-determined solids-lean portion of the liquid and solids mixture from the upper portion of the inner space of the second chamber. A certain portion of the solids-lean portion may be recycled prior to use to form a generally downward flow in the second container toward the bottom of the first container to further create a concentration of the solids-rich portion near the bottom of the first container for removal therefrom. It should be realized that the solids-lean portion of the liquid solids mixture may be employed in machining processes and the like and then be transported back to the first chamber found between the first and second container for concentration again. Such process may be continuous and, essentially, obviate the need to draw solids downwardly from the bottom of the first container.

It may be apparent that a novel and useful solids concentrator for a liquid and solids mixture has been hereinabove described.

It is therefore an object of the present invention to provide a solids concentrator for a liquid solids mixture which utilizes a minimum of moving parts.

It is another object of the present invention to provide a solids concentrator for a liquid solids mixture which is very easily integrated into a continuous system for providing solids-free liquid to a machining operation.

Another object of the present invention is to provide a solids concentrator for a liquid solids mixture which is compact in size and replaces machinery of a more complex nature.

Yet another object of the present invention is to provide a solids concentrator for a liquid solids mixture which eliminates the need for a sump tank and a drain conduit from the same.

Another object of the present invention is to provide a solids concentrator for a liquid solids mixture which is durable and reliable.

A further object of the present invention is to provide a concentrator for a liquid solids mixture which operates in a continuous system of supplying purified liquid to a machining operation and possesses a minimum of shut-down time to achieve such operation.

Another object of the present invention is to provide a solids concentrator for a liquid solids mixture which does not require pressurization to operate.

The invention possesses other objects and advantages especially as concerns particular and characteristics and features thereof which will become apparent as the specification continues.

Figure 1:
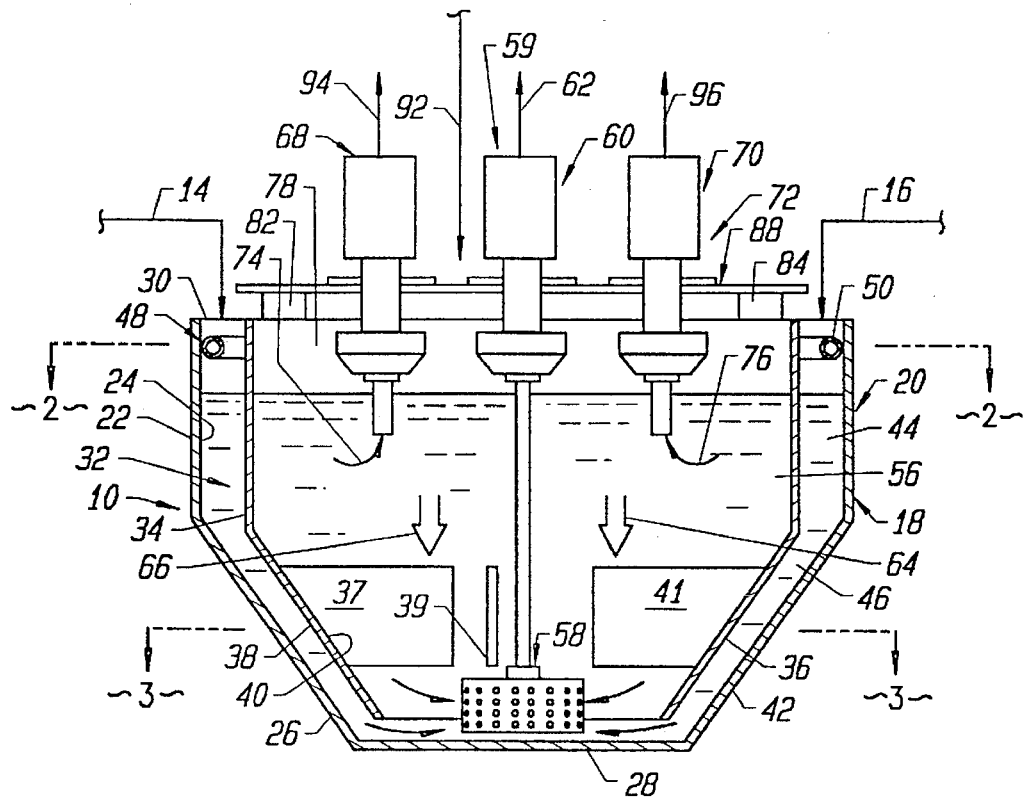
FIG. 1 is a sectional view depicting the concentrator of the present invention with the entry and removal means being shown in whole.

For a better understanding of the invention reference is made to the following detailed description of the preferred embodiments thereof which should be taken in conjunction with the hereinabove described drawings.

DETAILED DESCRIPTION OF THE PREFERRED EMBODIMENTS

Various aspects of the present invention will evolve from the following detailed description of the preferred embodiments thereof which should be referenced to the prior described drawings.

The invention as a whole is shown in the drawings by reference character 10. The solids concentrator 10 is used in conjunction with a stream of liquid containing solids which may be the result of a grinding operation, milling operation, printing operation, and the like. In general, such liquid is normally employed to cool the machinery during this operation, provide lubrication, and, to a certain extent, remove particulate matter from the immediate environment of such machinery. Streams 14 and 16, represented by arrows on FIG. 1, constitute the feed of liquid solids mixture intended for concentration by apparatus 10.

Concentrator 10 includes as one of its elements a first container 18 having a cylindrical upper portion 20. First container 18 includes an outer surface 22 and an inner surface 24. First container 18 may be constructed of any rigid or semi-rigid materials such as metals, composite plastics, ceramics, and the like. First container also possesses a lower portion 26 which narrows from its interconnection with cylindrical upper portion 20 to a bottom portion 28. Lower portion 26 is of a frusto-conical configuration and includes a transverse dimension at bottom 28 which is less than the transverse dimension across cylindrical upper portion 20. Upper portion 20 terminates in an open top 30. Again, lower portion 26 may be constructed of the same material as upper portion 20 of first container 18.

Second container 32, constructed of similar material as first container 18, is sized to fit within and is spaced from inner surface 22 of first container 18. Second container 32 includes a cylindrical upper portion 34 and a frusto-conical lower portion 36. Second container 34 also possesses an outer surface 38 and an inner surface 40. Frusto-conical lower portion terminates in an open mouth 42 which lies above bottom 28 of first container 18.

First chamber 44 is formed between the upper portions 20 and 34 of first and second containers 18 and 32, respectively. In addition, a second chamber 46 is formed between lower portion 26 of first container 18 and lower portion 36 of second container 32. It should be noted that the width of first chamber 44 is greater than the width of second chamber 46.

Entrance streams 14 and 16 are directed into first chamber 44 by conduits 48 and 50, respectively. The direction of the entrance streams into first chamber 44 is generally tangential to the inner surface 24 of first chamber 44. In this regard, although conduits 48 and 50 are depicted as linear in configuration, such conduits may be curved along the inner surface 24 of first chamber 44. In this way, the entrance streams 14 and 16 are forced to swirl or form a vortex pattern within first chamber 44 depicted by directional arrows 52 and 54, FIG. 2. Thus, conduits 48 and 50 may be deemed transporting means for introducing a liquid-solids stream for concentration purposes. Entrance streams 14 and 16 move downwardly from first chamber 44 into second chamber 46 and continue to swirl, which tends to separate the solids from the liquids through centrifugal force and the force of gravity. The swirling velocity is accentuated or increased when this stream is passed from first chamber 44 to second chamber 46, due to the narrowing of second chamber 46. Such increase in velocity further aids in the solids separation.

Figure 3:
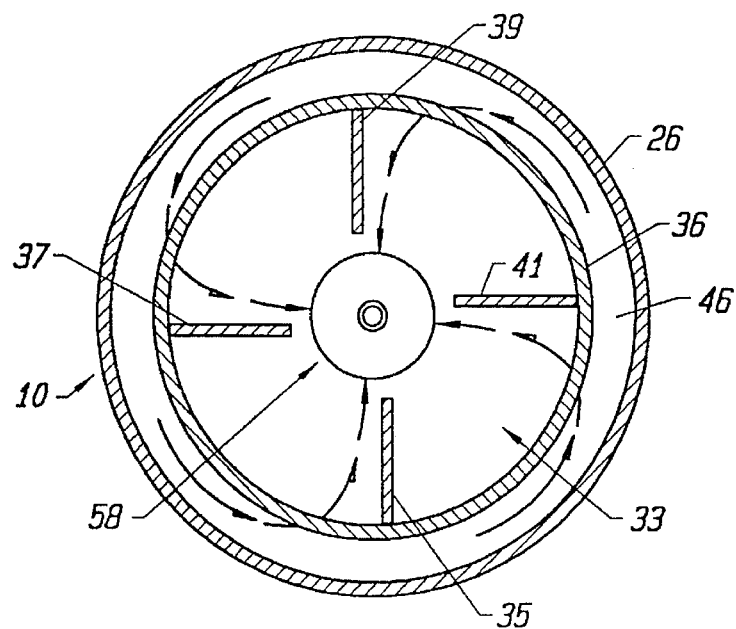
FIG. 3 is a sectional view taken along line 3—3 of FIG. 1.

Second container 32 includes an inner space 56 in which the liquid solids mixture moves in a generally laminar flow. Central conduit and screen unit 58 is connected to pump apparatus 60 to serve as first removal means for transporting a solids-rich portion of original liquid/solids mixture introduced into concentrator 10 through streams 14 and 16, FIGS. 1 and 3. Plurality of vanes 33 such as vanes 35, 37, 39, and 41 may be connected to lie vertically at inner surface 40 of second container 32, by welding, employing fasteners, and the like. Plurality of vanes 33 aid in the establishment of laminar flow within inner space 56 of second container 32. Stream 62 exiting pump apparatus 60 represents such solid-rich mixture. It should be noted that the removal of the solids-rich portion of the mixture within concentrator 10 tends to pull the liquid solids mixture within space 56 of second container 32 downwardly. Directional arrows 64 and 66 represent such downward laminar movement, FIGS. 1 and 3.

Figure 2:
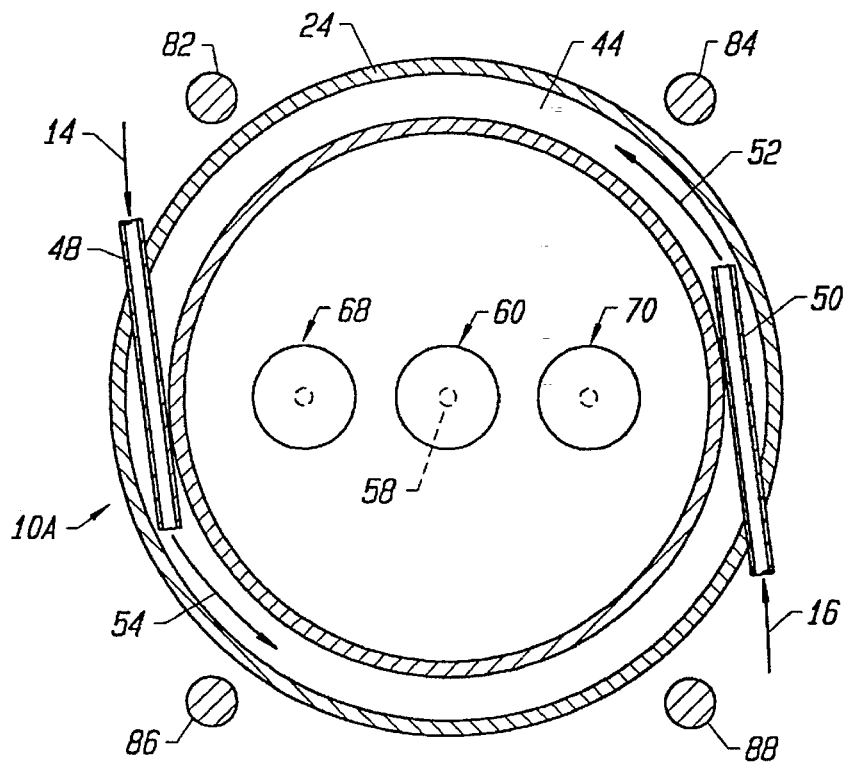
FIG. 2 is a sectional view taken along line 2—2 of FIG. 1, depicting an alternate embodiment of the present invention.

Pump apparatuses 68 and 70 serve as second means 72 for transporting the solids-lean portion of the mixture found in concentrator 10. Directional arrows 74 and 76 represent the removal of the solids-lean portion of the liquid solids mixture from within concentrator 10. The pump apparatuses 68, 70, and 72 are placed within opening 78 of second container 32 and are supported in that position by platform 80 having support posts 82, 84, 86, and 88, which extend to a ground surface, FIG. 2. It should be noted that FIG. 2 represents a concentrator 10A lacking plurality of vanes 33.

Figure 4:
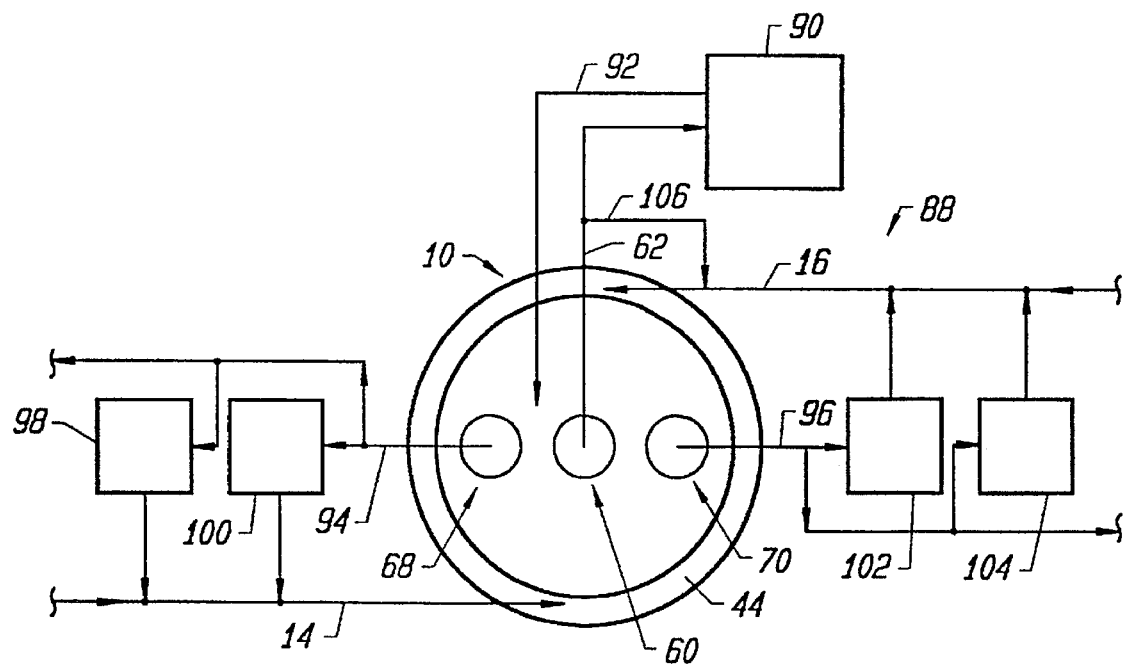
FIG. 4 is a generally schematic view depicting the concentrator of the present invention being employed in a continuous liquid purification system.

Turning to FIG. 4, it may be observed that a schematic rendition of concentrator 10 is depicted for use in a continuous system 88. Solids-rich stream 62 is sent to a cleaning device 90, such as a centrifugal separator similar to a Microseparator, model 100A, manufactured by Bazell Technologies Corporation of Concord, Cali. Stream 92 is returned to opening 82 of second container 32. Streams 94 and 96, FIGS. 1 and 4, representing the solids-lean liquid, are directed to user stations 98, 100, 102, and 104. As heretofore described, user stations 98, 100, 102, and 104 may be a grinding operation, cutting operation, and the like. Although only four (4) stations are depicted FIG. 4, further user stations may be employed commensurate with the capacity of concentrator 10 and pump mechanisms 60, 68, and 70. After use, liquid solids mixture are returned to entry streams 14 and 16, specifically conduits 48 and 50, which reintroduce the liquid solids mixture into chamber 44 of concentrator 10. Bypass line 106 diverts a portion of effluent solids-rich stream 62 to entrance stream 16 for the purposes of balancing flow patterns within inner space 56 of second container 32. Specifically, a downward flow according to directional arrows 64 and 66 is desired to further concentrate the solids-rich portion of the liquid solids mixture at the bottom of second container 32 or the bottom of chamber 46 where conduit and screen 58 lies.

In operation, concentrator 10 accepts inlet streams 14 and 16 for the purpose of concentrating the solids portion thereof. Conduits 48 and 50 force the inlet streams 14 and 16 tangentially along the inner surface 24 of first container 18 to induce centrifugal force on the solids portion by a spiral or vortex movement. Gravitational pull draws the liquid solids mixture downwardly into second chamber 46 where the stream is further accelerated, increasing the centrifugal force, by the narrowing of chamber 46 relative to chamber 44. At the bottom of chamber 46 toward the lower portion of inner space 56 of second container 32 conduit and screen 58 of first removal means 59 draws the solids-rich portion of the liquid solids mixture upwardly through pump 60 for cleaning. Likewise, pump apparatuses 68 and 70 draw the solids-lean portion of the liquid-solids mixture into "clean" streams 94 and 96 for use or reuse by user stations 98, 100, 102, and 104, which may be a manufacturing operation. Clean stream 92 is returned to second container 32 opening 78 to aid in the creation of the flow pattern downwardly from the top portion of container 32 to the bottom portion thereof, represented by directional arrows 64 and 66. Thus, the liquid-solids mixture is concentrated into a solids-rich portion, near conduit and screen 58, by the centrifugal force (chamber 44), accelerated centrifugal force (chamber 46), gravitational pull, and flow patterns within concentrator 10. With the exceptions of pumping apparatuses 60, 68, and 70, concentrator 10 includes no moving parts and provides a very reliable source of solids-lean liquid. The concentrator of the present invention also eliminates a sump drain at bottom portion 28, which permits the concentrator 10 of the present invention to be easily employed in a continuous operation represented by FIG. 4.

While in the foregoing, embodiments of the present invention have been set forth in considerable detail for the purposes of making a complete disclosure of the invention, it may be apparent to those of skill in the art that numerous changes may be made in such details without departing from the spirit and principles of the invention.

What is claimed is:

1. A solid concentrator for a liquid and solids mixture, comprising:
   a. a first container including an upper portion with a linear transverse dimension and a lower portion with a linear transverse dimension and a bottom portion, said upper portion linear transverse dimension being larger than said liner transverse dimension of said lower portion;
   b. a second container sized to fit within said first container, said second container including an upper portion having a linear transverse dimension and a lower portion having a linear transverse dimension, said upper portion linear transverse dimension being larger than said linear transverse dimension of said lower portion, said first and second container upper portions being spaced from one another to form a first chamber therebetween, said first and second container lower portions being spaced from one another to form a second chamber communicating with said first chamber; said second container further including an inner space, said inner space possessing an upper and lower portion, said inner space lower portion communicating with said second chamber lower portion;
   c. transporting means for introducing a flowable liquid and solids mixture to said first chamber, said transporting means including a conduit for directing the liquid and solids mixture into and along the first container upper portion;
   d. first removal means for transferring a predetermined solids-rich portion of said liquid and solids mixture selectively from said second chamber and said inner space of said second chamber at said lower portion thereof; and
   e. second removal means for transferring a predetermined solids-lean portion of said liquid and solids mixture from said inner space of said second chamber at said upper portion thereof.

2. The solids concentrator of claim 1 in which said first and second chambers are annular.

3. The solids concentrator of claim 2 in which said first and second container lower portion are conical.

4. The solids concentrator of claim 3 in which said first and second container upper portions are cylindrical, said first and second container lower conical sections lying closer to one another than said first and second container upper cylindrical portions.

5. The solids concentrator of claim 1 which further comprises bypass means for transporting a portion of said solids-lean portion removed back to said upper portion of said second container.

6. The solids concentrator of claim 1 which additionally comprises a strainer at the terminus of said first removal means.

7. The solids concentrator of claim 1 in which said entry means includes a plurality of conduits for directing the liquid and solids mixture into and along the first container upper portion.

8. The solids concentrator of claim 1 in which said first and second chambers are annular.

9. The solids concentrator of claim 8 in which said first and second container lower portion are conical.

10. The solids concentrator of claim 9 in which said first and second container upper portions are cylindrical, said first and second container lower conical sections lying closer to one another than said first and second container upper cylindrical portions.

11. The solids concentrator of claim 1, which additionally comprises at least one vane positioned within said inner space of said second container.

* * * * *